United States Patent [19]

Shikata

[11] Patent Number: 4,543,019
[45] Date of Patent: Sep. 24, 1985

[54] BORING TOOL

[75] Inventor: Hiroshi Shikata, Yokohama, Japan

[73] Assignee: Tokyo Shibaura Denki Kabushiki Kaisha, Kawasaki, Japan

[21] Appl. No.: 402,439

[22] Filed: Jul. 28, 1982

[51] Int. Cl.[4] .................. B23B 51/06; E21B 10/44
[52] U.S. Cl. .................... 408/57; 175/215; 175/323; 175/339; 175/394
[58] Field of Search ................... 408/56-60, 408/230; 175/215, 323, 324, 393, 394, 417, 339, 340, 211; 15/104.1 R, 104.1 C; 407/11; 409/135, 136; 299/87, 55, 56

[56] References Cited

U.S. PATENT DOCUMENTS

| 3,511,120 | 5/1970 | Kaser | 407/11 X |
| 3,565,190 | 2/1971 | Ishii | 175/323 X |
| 3,656,565 | 4/1972 | Fox | 175/323 |
| 4,049,066 | 9/1977 | Richey | 175/323 |
| 4,322,189 | 3/1982 | Briese | 409/136 |
| 4,402,371 | 9/1983 | Rocchetti | 175/394 X |

FOREIGN PATENT DOCUMENTS

| 564406 | 1/1976 | U.S.S.R. | 175/323 |
| 646030 | 2/1979 | U.S.S.R. | 175/215 |
| 0850325 | 7/1981 | U.S.S.R. | 408/59 |

Primary Examiner—William R. Briggs
Attorney, Agent, or Firm—Oblon, Fisher, Spivak, McClelland & Maier

[57] ABSTRACT

A boring tool which comprises a hollow boring tool body constructed by fitting a hollow boring head provided with cutting tips to the end of a hollow boring bar, and wherein an inner leftward twisted screw is formed on the inner peripheral wall of the hollow boring bar; and an outer rightward twisted screw is formed on the outer peripheral wall of the hollow boring bar; when the boring tool body is clockwise rotated, the cutting fluid is carried forward to the end of the boring tool by the inner leftward twisted screw, and the cutting fluid which has cooled and lubricated the cutting tips and chips entrained with said cutting fluid are forcefully discharged by the outer rightward twisted screw.

8 Claims, 3 Drawing Figures

F I G. 1
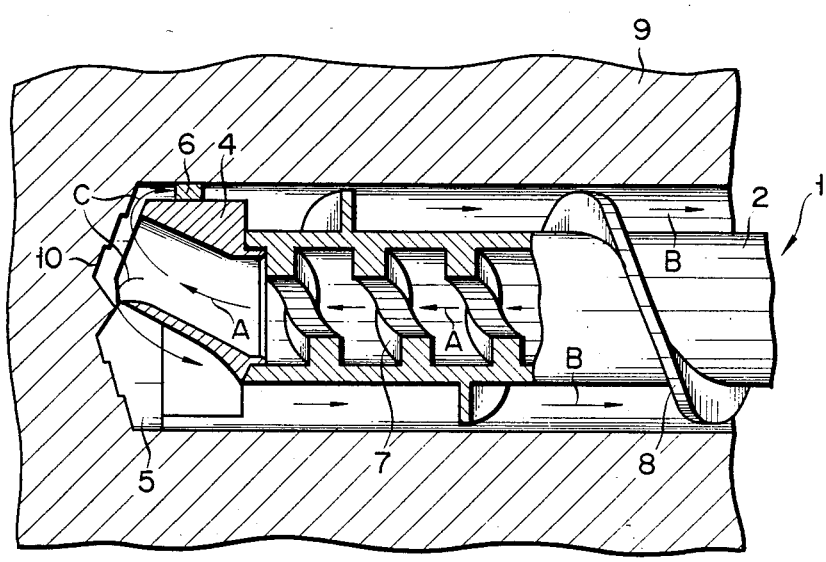

BORING TOOL

BACKGROUND OF THE INVENTION

This invention relates to a boring tool to which a cutting fluid is applied to cool and lubricate cutting tips and guide pad and discharge chips.

In a conventional hollow type boring tool, a compressed cutting fluid is supplied through inside of the boring tool to cool and lubricate cutting tips and the flowing direction of the cutting fluid is changed at the bottom of the bored hole so that chips are discharged to the outside along the outer wall of the boring tool by the streams of the cutting fluid. However, the conventional boring tool has the drawbacks that it is necessary to provide a pump which has a sufficiently high discharge pressure; and the backward flow of the cutting fluid has too weak a force to efficiently draw off chips.

In another known hollow type boring tool, a boring bar has a double tube construction consisting of inner and outer tubes, and the peripheral wall of the outer end of the inner tube is provided with a plurality of holes or slits which are inclined rearward toward the inside of the inner tube. With the latter known boring tool, a cutting fluid is supplied through a space defined between the inner and outer tubes to cool and lubricate cutting tips. This cutting fluid which is now contaminated with chips runs in the opposite direction at the top of the cutter head. Some of the cutting fluid is backward diverted through the holes or slits and runs inside the inner tube toward a proximal end of the boring tool without cooling and lubricating the cutting tips. The afore-mentioned cutting tip-cooling portion of the cutting fluid is drawn out through the inner tube by the absorbing action of the diverted cutting fluid stream. In this case, however, it is necessary to divert about two-thirds of the original amount of a cutting fluid through the holes or slits toward the inside of the inner tube without cooling a cutting tip in order to effectively remove chips entrained with the cutting tip-cooling fluid. In other words, only about one-third of the original amount of the cutting fluid actually contributes to the cooling and lubrication of the cutting tips. Therefore, it is necessary to apply a considerable amount of a cutting fluid and provide a large capacity pump in order to effectively carry out the cooling and lubrication of the cutting tips and also the removal of chips. Sometimes, chips entrained with the circulatively used cutting fluid tend to plug the holes or slits bored in the inner tube. Further, the formation of holes or slits in the inner tube undesirably reduces its mechanical strength. Chips have to be finely broken in order to be easily carried by the cutting fluid. Consequently, the latter type of the known boring tool has its application limited within a relatively narrow range.

SUMMARY OF THE INVENTION

Accordingly, this invention has been accomplished to eliminate the drawbacks accompanying the aforementioned conventional boring tools and is intended to provide a boring tool which assures the forceful flow of a cutting fluid and the easy removal of chips by utilizing the rotation of the body of the boring tool itself.

To attain the above-mentioned object, this invention provides a hollow boring tool which comprises a hollow boring head provided with cutting tips and fitted to the end of a hollow boring bar; and cutting fluid-forwarding means for conducting the cutting fluid to the cutting tips by the rotation of the boring tool itself; and means for drawing off the cutting fluid and the chips entrained therewith by the roration of the boring tool itself.

BRIEF DESCRIPTION OF THE DRAWINGS

FIG. 1 is a longitudinal sectional view of a boring tool according to a first embodiment of this invention;

DETAILED DESCRIPTION OF THE PREFERRED EMBODIMENTS

Figure 2:
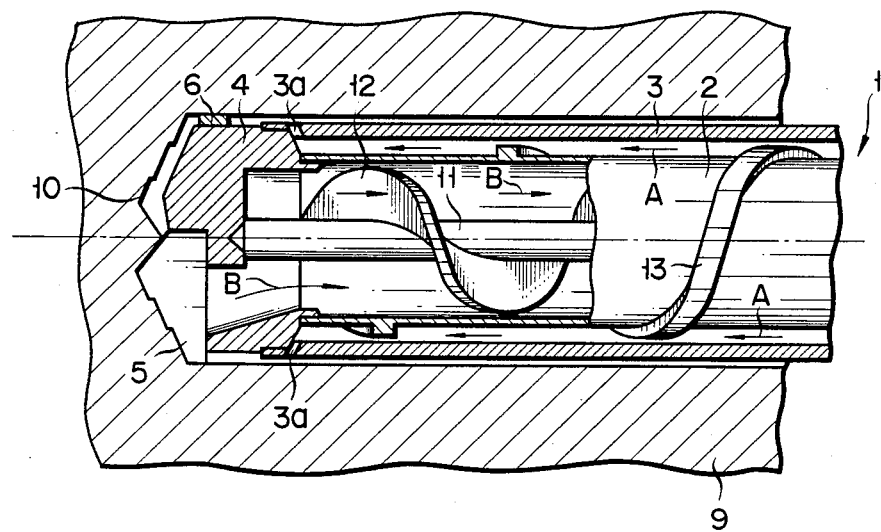
FIG. 2 is a longitudinal sectional view of a boring tool according to a second embodiment of the invention.

Description is now given with reference to FIG. 1 of a boring tool according to the first embodiment of this invention. Reference numeral 1 denotes a hollow boring tool body comprising a hollow boring head 4, for example, detachably screwed to the end of a hollow boring bar 2. The top of the boring head 4 is fitted with cutting tips 5 of hard material, for example, tungsten carbide. The outer peripheral wall of the boring head 4 is provided with a guide pad 6 to absorb the reaction force of the cutting tips 5. An inner leftward twisted screw 7 is formed on the inner peripheral wall of the hollow boring bar 2. An outer rightward twisted screw 8 is formed on the outer peripheral wall of the hollow boring bar 2.

A cutting fluid is taken into the hollow boring bar 2. When the boring bar 2 is rotated clockwise, the cutting fluid is forcefully conducted by the inner leftward twisted screw 7 in the direction of an indicated arrows A toward the end of the boring tool 1. When reaching the end of the hollow boring head 4, the cutting fluid has its course diverted in the direction of indicated arrows C at the bottom of a hole bored in a workpiece 9. During this period, the cutting tips 5 and guide pad 6 are cooled and lubricated. Thereafter, the cutting fluid carrying chips is forcefully drawn off in the direction of indicated arrows B by the outer screw 8 twisted rightward, namely in the opposite direction to the inner leftward twisted screw 7. When boring is effected, for example, at a cutting speed of 60 to 100 m/min by the hollow boring head 4 which has an outer diameter of 100 mm and is fitted with cutting tips 5 prepared from, for example, tungsten carbide, the hollow boring bar 2 is rotated at a speed of about 200 to 300 r.p.m., thereby enabling the inner and outer screws 7, 8 to carry out an effective pumping action.

Figure 3:
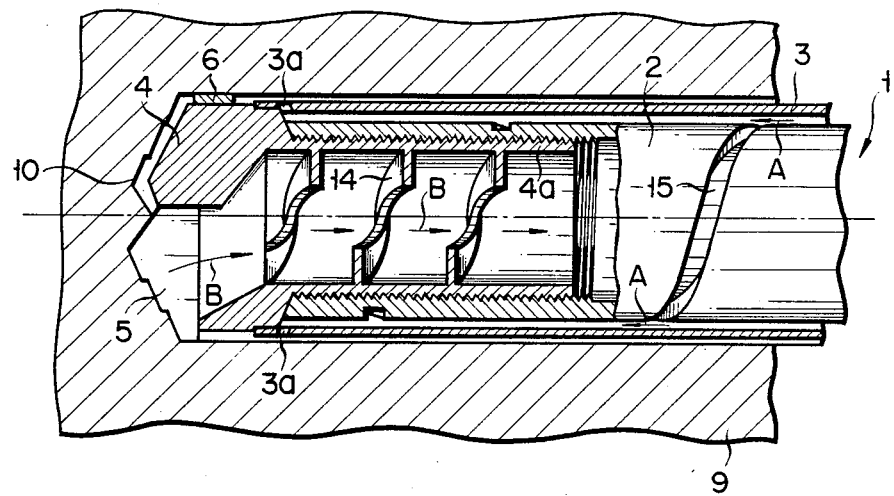
FIG. 3 is a longitudinal sectional view of a boring tool according to a third embodiment of the invention.

Description is now given with reference to FIGS. 2 and 3 of boring tools according to the second and third embodiments of this invention. A hollow boring tool body 1 is constructed by fixing a hollow boring head 4 to the end of a hollow boring bar 2 and fitting a outer tube 3 surrounding the hollow boring bar 2 to the hollow boring head 4. The outer peripheral wall of the end of the outer tube 3 is bored with a plurality of cutting fluid efflux holes 3a.

Referring to FIG. 2, reference numeral 11 denotes a screw shaft provided with a rightward twisted screw 12. This screw shaft 11 is fixed to the hollow boring head 4 and is inside of the hollow boring bar 2 having a smooth inner wall. An outer leftward twisted screw 13 is formed on the outer peripheral wall of the hollow boring bar 2. When the hollow boring bar 2 is rotated while a cutting fluid is supplied from a space defined between the hollow boring bar 2 and outer tube 3, the cutting fluid is forcefully carried forward in the direction of indicated arrows A by an outer leftward twisted screw 13 and runs out of the efflux holes 3a to cool and lubricate the cutting tips 5 and guide pad 6. Thereafter, the cutting fluid carrying chips is forcefully drawn off through the hollow boring bar 2 in the direction of indicated arrows B by the inner rightward twisted screw 12. In the case of FIG. 2, where the outer tube 3 surrounds the hollow boring bar 2, the supply of the cutting fluid and the recovery of the discharged cutting fluid can be effected at the shank side of the boring tool body 1, thereby facilitating the circulation of the cutting fluid and the disposal of chips. In the case of FIG. 1, however, it is necessary to provide a particular device for recovery of the cutting fluid.

Referring to FIG. 3, a hollow boring head 4 comprises an integral cylindrical section 4a which is threadedly engaged with the inner wall of a hollow boring bar 2 having a smooth inner wall. An inner rightward twisted screw 14 is formed on the inner peripheral wall of the cylindrical section 4a. A leftward twisted helical groove 15 is formed in the outer peripheral wall of the hollow boring bar 2. When, as in FIG. 3, the hollow boring bar 2 is rotated clockwise, while a cutting fluid is supplied from a space defined between the hollow boring bar 2 and outer tube 3, then the cutting fluid is forcefully carried forward by the leftward twisted groove 15 in the directions of indicated arrows A. The cutting fluid which has cooled and lubricated the cutting tips 5 and now carries chips is forcefully sent backward by the inner rightward twisted screw 14 of the hollow boring head 4 in the direction of indicated arrows B, and then drawn off through the hollow boring bar 2.

The screws 7, 8 need not be integrally formed respectively on the inner and outer peripheral wall of the hollow boring bar 2. It is possible to fit, for example, a helisert to the outer and inner peripheral walls of the hollow boring bar 2 respectively. The cross sections of the screw 14 and groove 15 can be shaped not only like a rectangle, but also like a triangle, trapezoid or semicircle depending on the object intended. Further, the screw may be made in the multithread form. It is possible to progressively change the pitch of the screw 14 and helical groove 15 or continuously increase or decrease the height or width of the respective threads of the screw 14 or the depth or width of the helical groove 15. The screw may be replaced by a propeller, pump blade or turbine blade which can conduct a fluid or gas in the axial direction.

The boring tool of this invention is applicable not only to the boring of a metal, but also to the drilling of an oil well by forcefully supplying and discharging mud from the inside and outside of the hollow boring bar.

The boring tool of the invention has the following advantages:

(1) A helical projection or groove is provided on the inner or outer peripheral wall of a hollow boring bar or hollow boring head included in a hollow boring tool body in the oppositely twisted relationship. A cutting fluid is axially carried forward or backward by the rotation of the boring tool body itself. Therefore, the supply and recovery of the cutting fluid and the removal of chips can be effectively carried out without applying, for example, a pump generating a high discharge pressure.

(2) The boring tool has a simple construction and is prevented from being plugged by chips or impurities contained in the cutting fluid. When the boring bar is fitted with, for example, a screw, the boring tool can be increased in mechanical strength.

(3) Chips are forcefully drawn out, for example, by the rotating screw. Therefore, it is unnecessary to finely crush chips, enabling the boring tool to be applied within a broad range of cutting conditions.

What is claimed is:

1. A boring tool which comprises:
   a hollow boring tool body comprising a hollow boring bar having inner and outer walls, a hollow boring head fitted to one end of said hollow boring bar and cutting tips fitted to the end of said hollow boring head;
   a cutting fluid-supply system providing cutting fluid to said cutting tips consisting of cutting fluid-supplying means associated with said hollow boring tool body for forcefully carrying forward from the other end of said hollow boring bar an externally supplied cutting fluid to the end of said hollow boring head due to the rotation of said boring tool body; and
   cutting fluid-discharging means associated with said hollow boring tool body for carrying back to said other end of said hollow boring bar the cutting fluid which has been forcefully carried forward to said one end due to the rotation of said boring tool body.

2. The boring tool according to claim 1, wherein said cutting fluid-supplying means is positioned radially outside of the outer wall of said hollow boring tool body and said cutting fluid-discharging means is positioned radially inside of the inner wall of said hollow boring tool body.

3. The boring tool according to claim 1, wherein said cutting fluid-supplying means is positioned radially inside of the inner wall of said hollow boring tool body and said cutting fluid-discharging means is positioned radially outside of the outer wall of said hollow boring tool body.

4. The boring tool according to claim 1, 2 or 3, wherein said cutting fluid-supplying means and cutting fluid-discharging means are each formed of a helical projection or groove.

5. The boring tool according to claim 1, 2 or 3, wherein said cutting fluid-supplying and cutting fluid-discharging means are each formed of blades mounted on the hollow boring tool body to axially carry the cutting fluid.

6. The boring tool according to claim 1, 2 or 3, wherein said hollow boring tool body is constructed by mounting an outer tube on, and spaced from, the outer wall of the hollow boring bar.

7. The boring tool of claim 1, wherein said cutting fluid-supplying means and cutting fluid-discharging means each comprise at least one continuous spiral element fixed adjacent one of said inner and outer walls, and wherein said cutting fluid-supplying means comprise the only means for supplying cutting fluid to said hollow boring head.

8. The boring tool of claim 7 wherein said hollow boring head lacks means for advancing said cutting fluid toward said cutting fluid-supplying means and cutting fluid-discharging means.

* * * * *